United States Patent
Tumblin et al.

(10) Patent No.: US 7,038,185 B1
(45) Date of Patent: May 2, 2006

(54) CAMERA FOR DIRECTLY GENERATING A GRADIENT IMAGE

(75) Inventors: Jack Tumblin, Evanston, IL (US); Amit Agrawal, Greenbelt, MD (US); Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/001,396

(22) Filed: Dec. 1, 2004

(51) Int. Cl.
*H01L 27/00* (2006.01)
*G01J 1/42* (2006.01)

(52) U.S. Cl. ............................. 250/208.1; 250/208.2; 382/199; 348/371

(58) Field of Classification Search ............ 250/208.1, 250/208.2, 214 R; 348/371, 241; 382/199, 382/203
See application file for complete search history.

(56) References Cited

U.S. PATENT DOCUMENTS 6,021,222 A * 2/2000 Yamagata .................. 382/199
6,191,408 B1 * 2/2001 Shinotsuka et al. ...... 250/208.1
2004/0183940 A1 * 9/2004 Raskar ....................... 348/371

OTHER PUBLICATIONS

Xiao, et al., "*Image analysis using modulated light sources,*" Proc. SPIE Image Sensors, vol. 4306, pp. 22-30, 2001.
Fattal, et al., in "*Gradient domain high dynamic range compression,*" ACM SIGGRAPH, pp. 249-256, 2002.
Tappen, et al., "*Exploiting the sparse derivative prior for super-resolution and image demosaicing,*" 3rd Intl. Workshop on Stats. and Computl. Theories of Vision, 2003.
Mann, et al, "*On Being undigital with digital cameras: Extending dynamic range by combining differently exposed pictures,*" Proc. of IST 46th Annual Conf., pp. 422-428, 1995.

(Continued)

*Primary Examiner*—Stephone B. Allen
*Assistant Examiner*—Patrick J. Lee
(74) *Attorney, Agent, or Firm*—Dirk Brinkman; Andrew J. Curtin

(57) ABSTRACT

A camera includes a set of sensing elements. Each sensing element is arranged at an image plane in an energy field to measure a magnitude and sign of a local gradient of the energy field. Each sensing element includes at least two energy intensity sensors. Each energy sensor measures a local intensity of the energy field. Logarithms of the intensities are subtracted from each other to obtain the magnitude and sign of the gradients. A Poisson equation is solved using the gradients to obtain an output image of the energy field.

65 Claims, 6 Drawing Sheets

OTHER PUBLICATIONS

Debevecet al., "Recovering high dynamic range radiance maps from photographs," ACM SIGGRAPH, pp. 369-378, 1997.

Nayar, et al., "Adaptive dynamic range imaging: Optical control of pixel exposures over space and time," Proc. Int'l Conf. Computer Vision, 2003.

Nayar, et al., *"Programmable imaging using a digital micromirror array,"* Proc. Conf. Computer Vision and Pattern Recognition, 2004.

Jian Sun, Jiaya Jia, Chi-Keung Tang, and Heung-Yeung Shum, *"Poisson matting,"* ACM Trans. Graph., 23(3), pp. 315-321, 2004.

* cited by examiner

100

200

600

CAMERA FOR DIRECTLY GENERATING A GRADIENT IMAGE

FIELD OF THE INVENTION

The invention relates generally to sensing energy fields, and more particularly to generating images with cameras.

BACKGROUND OF THE INVENTION

Cameras

There are two well-known techniques for generating digital images. In the first technique, an analog film is exposed to an energy field, for example, visible light. The film is developed and digitized using a scanner. The resulting image includes pixel values that reflect the intensity distribution of the energy field. The image can also show the frequency distribution, or 'color' of the energy field.

In the second technique, an array of digital sensors is arranged on an image plane in an energy field. The sensors measure the intensity of the energy directly. The sensors can also be made frequency selective by using filters. As an advantage, the second technique produces results immediately and does not consume any film. For these and other reasons, digital cameras are rapidly replacing analog cameras.

In a conventional analog camera, the light sensitive material is film. In a conventional digital cameras, the light sensitive material is a charge coupled device (CCD). The amount of light reaching the film or CCD is known as exposure. Exposure is a function of the aperture size and shutter speed. In some cases, the depth of focus may need to be sacrificed to obtain an acceptable exposure for a particular exposure time.

In the output digital image, the energy field is expressed as a grid of pixel values. Each pixel value corresponds, in the largest part, to the amount of sensed energy. However, the pixel values can also include the results of uncorrelated noise, e.g., noise due to heat, quantization errors, discrete electromagnetic flux, and imperfections in the sensors, circuits and process.

Both techniques impose the same choices and same tasks on the user, such as selecting a scene, a field-of-view, and a camera location. For more complicated cameras, that are not limited to simply 'point-and-shoot' capability, a user must also select the exposure time, lens aperture, and other settings. The settings are a compromise that best captures the appearance of the scene. In many poorly lit scenes, it is difficult to avoid over-exposure, under-exposure, noise, and motion blur due to camera limitations.

Both conventional analog and digital cameras have exposure, lens and sensor limitations. These limitations result in zoom-dependent chromatic aberration, color metamerism, color balance errors from mixed illumination, coupled zoom and focus adjustments, glare or 'blooming' of excessively brilliant objects, and lens flare caustics.

Alternate techniques to conventional intensity sensing cameras are also described in the prior art. Several 'smart sensing' chips integrate photo-detecting elements and processing circuits to obtain better performance, or to make the sensing and processing components more compact.

The silicon retina and adaptive retina described by Mead in "Analog VLSI implementation of neural systems," Chapter Adaptive Retina, pages 239–246, Kluwer Academic Publishers, 1989, uses a chip-based model of the vertebrate retina.

Funatsu, et al., in "An artificial retina chip with a 256×256 array of N-MOS variable sensitivity photodetector cells," Proc. SPIE. Machine Vision App., Arch., and Sys. Int., vol. 2597, pages 283–291, 1995, described modulation of an input image by directly modulating output from photodetectors. However, most of those systems have special hardware designed for specific applications, such as feature detection. As a result, those systems only display selected features, and cannot reconstruct a complete output image from the original 2D intensity field.

With the development of high-speed, complementary metal oxide semiconductor (CMOS) imaging sensors, it became possible to acquire and process multiple input images before generating the output image. The imaging architecture that acquires multiple input images and produces a single output image is referred as 'multiple capture single image' (MCSI), see Xiao, et al., "Image analysis using modulated light sources," Proc. SPIE Image Sensors, vol. 4306, pages 22–30, 2001.

Single instruction, multiple data (SIMD) processor arrays with programmable circuits that analyze continuous pixel values are available in the Ranger™ camera made by Integrated Vision Products, Wallenbergs gata 4, SE-583 35, Linkoping, Sweden. The Ranger cameras allow the user to upload microcode to operate on pixel values, see Johansson, et al. "A multiresolution 100 GOPS 4 gpixels/s programmable CMOS image sensor for machine vision," IEEE Workshop on CCD and Advanced Image Sensors, 2003.

Another technique acquires MCSI images and decodes high frequency optical codes from strobing LEDs, even in the presence of ambient light, see Matsushita et. al., "Id cam: A smart camera for scene capturing and id recognition," ISMAR, pages 227–236, 2003.

Image Generation

The number of image generation methods that are known is too large to detail here. Most methods operate directly on pixel intensity values. Other methods extract image gradients from the intensity values of the output image. The gradients are then further processed to produce images with high dynamic range (HDR) tone mapping, shadow removal, and other image editing operations.

Another technique is based on the observation that the human visual system is more sensitive to local contrast rather than absolute light intensities. That technique uses a tone mapping scheme for rendering high dynamic range images on conventional displays, see Fattal, et al., in "Gradient domain high dynamic range compression," ACM SIGGRAPH, pages 249–256, 2002.

Another technique applies edge-based compression to images, see J. Elder, "Are Edges Incomplete?," International Journal of Computer Vision, 34(2/3):97–122, 1999. Analysis of gradients, which are a zero-peaked histogram, provide schemes for super-resolution and image demosaicing from Bayer patterns, see Tappen, et al., "Exploiting the sparse derivative prior for super-resolution and image demosaicing," 3rd Intl. Workshop on Stats. and Computl. Theories of Vision, 2003.

Techniques for acquiring HDR images have mostly relied on multiple exposures or on adjusting the sensitivity of each individual pixel according to the intensity of incident light, see Mann, et al, "On Being undigital with digital cameras: Extending dynamic range by combining differently exposed pictures," Proc. of IST 46th Annual Conf., pages 422–428, 1995, Kang, et al., "High dynamic range video," ACM Trans. Graphics, 22(3):319–325, July 2003, and Debevec et al., "Recovering high dynamic range radiance maps from photographs," ACM SIGGRAPH, pages 369–378, 1997.

Log-responding cameras have been used to acquire HDR images. However, those output images have a reduced linear resolution at higher intensities.

One HDR technique performs an adaptive attenuation of pixel intensity values, and spatially varies pixel exposures, see Nayar, et al., "*Adaptive dynamic range imaging: Optical control of pixel exposures over space and time*," Proc. Int'l Conf. Computer Vision, 2003.

Another imaging system uses a programmable array of micro-mirrors. The array enables modulation of scene rays, see Nayar, et al., "*Programmable imaging using a digital micromirror array*," Proc. Conf. Computer Vision and Pattern Recognition, 2004.

Measurement Methods

Most conventional analog and digital cameras measure static light intensities. That is, the cameras average the intensities over time according to:

$$I_d(m, n) = (kI_s(m, n))^y, \quad (1)$$

where $I_d$ is a normalized output intensity value, in a range $0.0 \leq I_d \leq 1.0$, at a 'display' pixel (m, n), $I_s$ is a sensed energy acquired at a corresponding photosensor (m, n), k is exposure, e.g., gain, light sensitivity or film speed, and y is contrast sensitivity. Typically, the contrast sensitivity y for CCDs is approximately one. If the sensitivity y is less than one, then the contrast is decreased, otherwise, if the sensitivity is greater than one, then the contrast is increased.

Equation (1) can be expressed logarithmically, where differences directly correspond to contrast ratios, $$\log(I_d) = y(\log(I_s) + \log(k)). \quad (2)$$

Equation 2 reveals that the contrast sensitivity y is a scale factor for contrast, and the exposure k, in logarithmic units, is an offset.

In most conventional cameras, the contrast sensitivity y is uniform across the entire acquired image. This ensures that each pixel value is within a predetermined range of intensity values. Pixel-to-pixel intensity variations in k and y have strong effects on the appearance of the output image.

However, as stated above, the display intensity $I_d$ also includes noise due to discrete photon arrivals, thermal noise in sensor devices, non-uniform sensor materials and circuit components, e.g., fixed-pattern noise, and outside interference, e.g., EMI/RFI, 'light leaks,' and noise induced by processing imperfections. Noise 'hides' the precise display value $I_d$, so that A/D conversion precision beyond twelve to fourteen bits rarely improve assessments of the signal for sensors that are not artificially cooled. Many conventional digital cameras measure raw pixel sensor intensities as ten or twelve bit values.

Most conventional digital cameras are also "quasi-linear," where the displayed values $I_d$ values are intended to be directly proportional to scene intensity values $I_s$, but include some contrast compression, e.g., y=0.455, to compensate for the contrast exaggeration of conventional computer displays, e.g., y=2.2, so that resulting apparent contrast sensitivity is approximately one.

Specifying the exposure k by the scene intensity $I_s$ causes display intensity values $I_d=1.0$ to display 'white'. Contrast limitations of the display device then appear as a lack of details in dark areas of the display device.

The A/D resolution and contrast sensitivity y also set an upper limit on the contrast range of conventional quasi-linear digital cameras. With $2^b$ uniform quantization levels for display intensity values $I_d$, a fixed k and a fixed y, the largest ratio of scene intensifies the camera can acquire is $$C_{max} = I_{smax}/I_{smin} = 2^{-b/y}, \text{ or}$$

$$(\log(1) - \log(2^b)) = y(\log(I_{smax}) - \log(I_{smin})).$$

Some conventional digital cameras can also imitate a 'knee' and 'shoulder' response of photographic film, where the contrast sensitivity y smoothly approaches zero for $I_d$ values near the extremes of 0.0 and 1.0 intensities. The less-abrupt termination of camera contrast response can preserve some detail in otherwise black shadows and white highlights. However, just as with film, those efforts are still insufficient to produce detailed images of HDR scenes.

Many interesting scenes contain contrasts that are far too large for most A/D converters. In those HDR scenes, conventional exposure-control methods often fail, and the user must unfortunately select which visible scene features are lost due to glaring white or featureless black.

Quantization levels for log-responding digital cameras follow Fechner's law. Fechner found intensity changes of about one or two percent are a 'just noticeable difference' for the human vision system. However, like conventional cameras, the quantization levels selected for log-responding cameras must span the entire dynamic range of scene intensities $I_s$, and all scene intensities that are not within that range are irretrievably lost.

Therefore, it is desired to provide a camera for generating images that can reproduce high dynamic range details, and that overcomes the many problems of the prior art.

SUMMARY OF THE INVENTION

The invention provides a method and apparatus for sensing an energy field, for example, visible light in a scene. The apparatus includes a set of energy sensing elements. Each sensing element senses the magnitude and sign of the local gradient of the energy field directly. The output image is generated from the local gradients, and not from signal intensities as in prior art cameras.

In particular, a gradient camera and method according to the invention measure static gradients, instead of static intensities, as in conventional cameras. The signed gradients are quantized for each sensing element. An exposure and averaging time is determined locally for each sensing element. Solving a Poisson equation using the gradients can generate the intensity values for the output image.

The invention measures the local gradients in the energy field directly in a single exposure. Therefore, common-mode noise is reduced. The invention can generate a detailed, high-contrast HDR output images that is not subject to pixel intensity saturation as for conventional cameras.

The invention reduces quantization noise, and enables correction of saturation at individual sensing element. No exposure metering is required, and the lens aperture can be used to strictly control depth of focus.

DETAILED DESCRIPTION OF THE PREFERRED EMBODIMENT

System Overview

Figure 1:
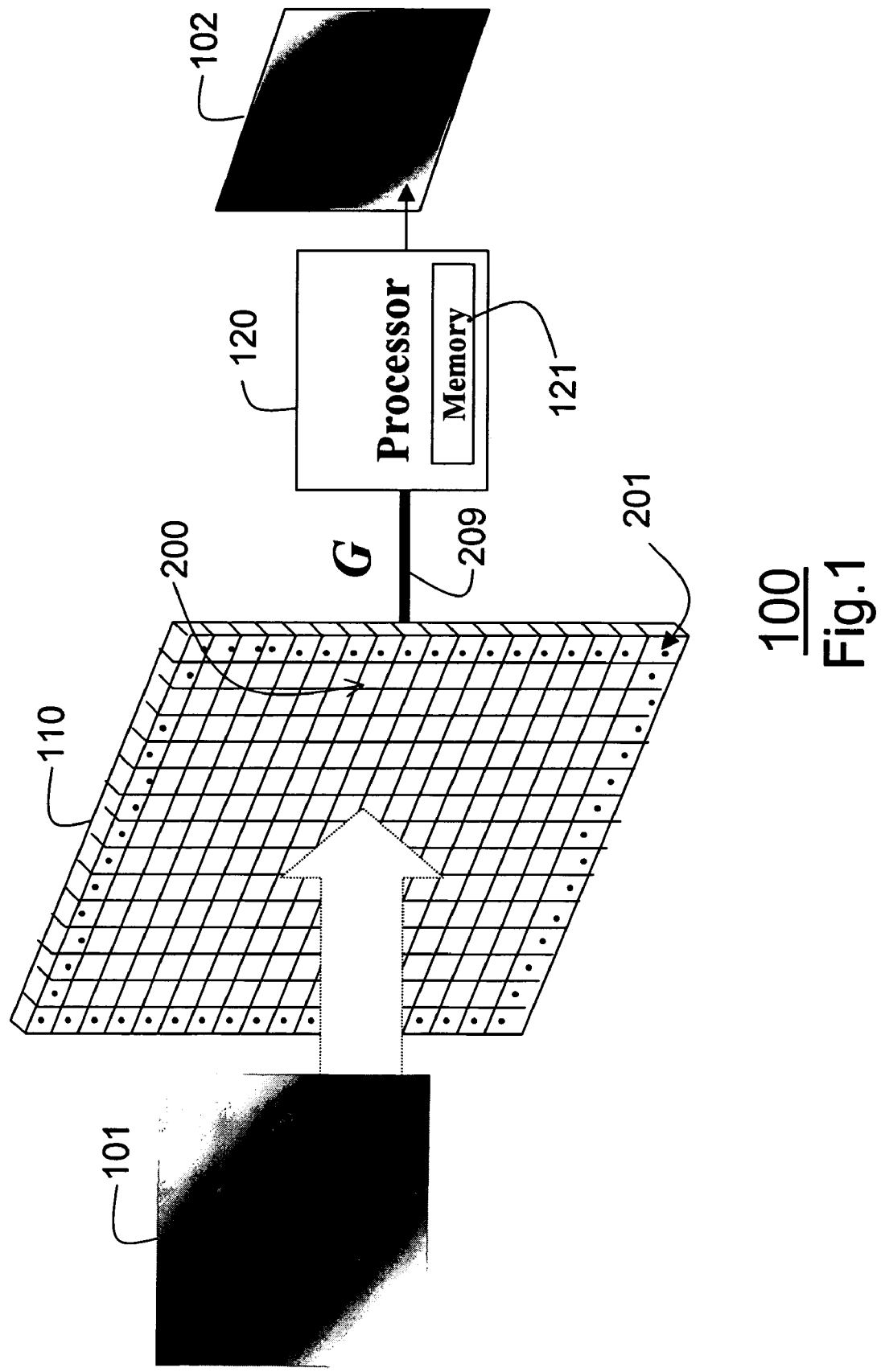
FIG. 1 is a block diagram of a gradient sensor according to the invention.

FIG. 1 shows a system 100, according to our invention. The system senses an energy field 101 and generates a digital output image 102 representing the sensed energy field, e.g., electromagnetic radiation, such as visible light.

Figure 6:
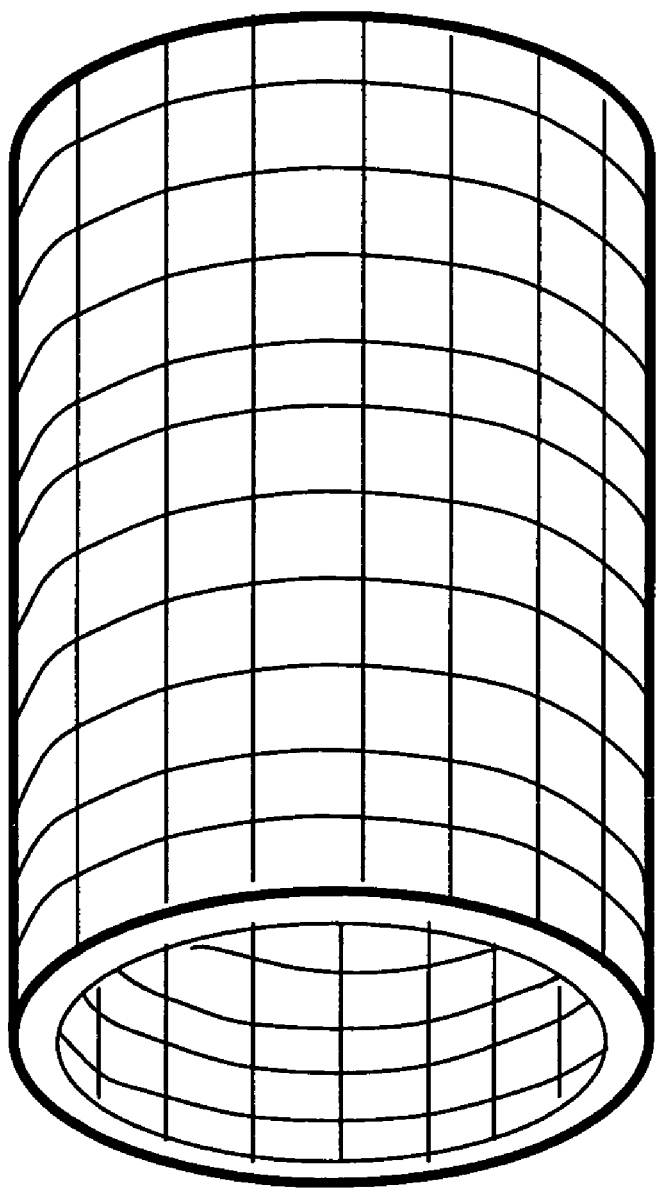
FIG. 6 is a block diagram of a cylindrical sensor according to an embodiment of the invention.

Our system includes a set 110 of sensing elements 200. The set of sensing elements are spatially arranged in the energy field 101. For example, the elements 200 can be arranged at an image plane as an N×M array of elements as shown. Alternatively, the sensing elements can be arranged as an annular ring or cylinder 600, as shown in FIG. 6, to enable three-dimensional scanning of an energy field as used in medical and high energy physics applications. Other arrangements, such as 3D arrays, are also possible. In the preferred embodiment, the sensor elements 200 also include a set of boundary elements 201 at a periphery of the N×M array, as indicated by dots.

Gradient Sensing Elements

Each of our sensing elements 200 measures a magnitude and sign of a local gradient G 209 of that portion of the energy field incident only on the element. The gradients 209 can be stored in a memory 121 and further processed 120, as described herein, to generate the output image 102. It should be understood that the system also can include a lens, shutter and filters.

Figure 2:
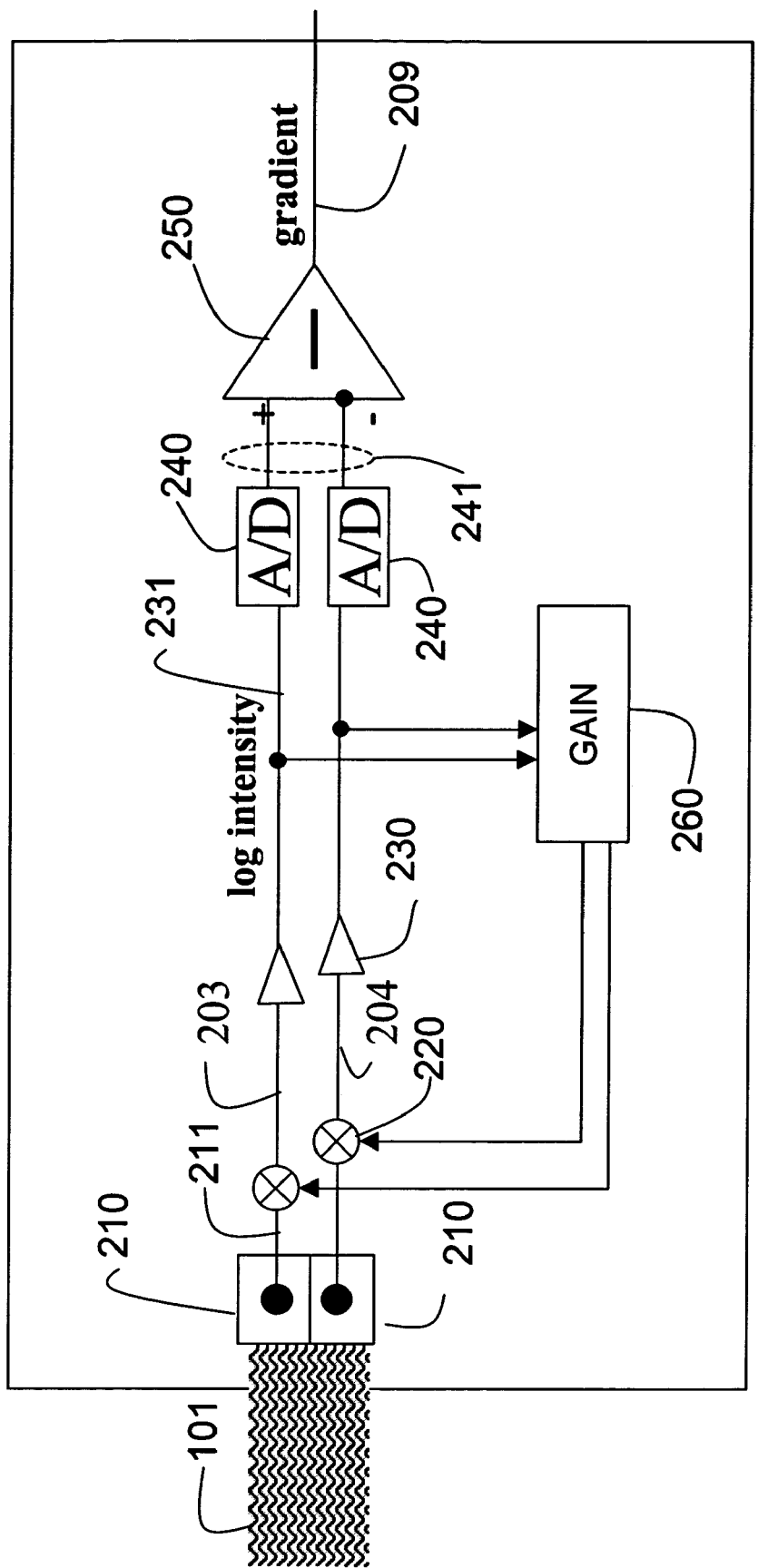
FIG. 2 is a circuit diagram of a gradient sensing element according to the invention.
Figure 3:
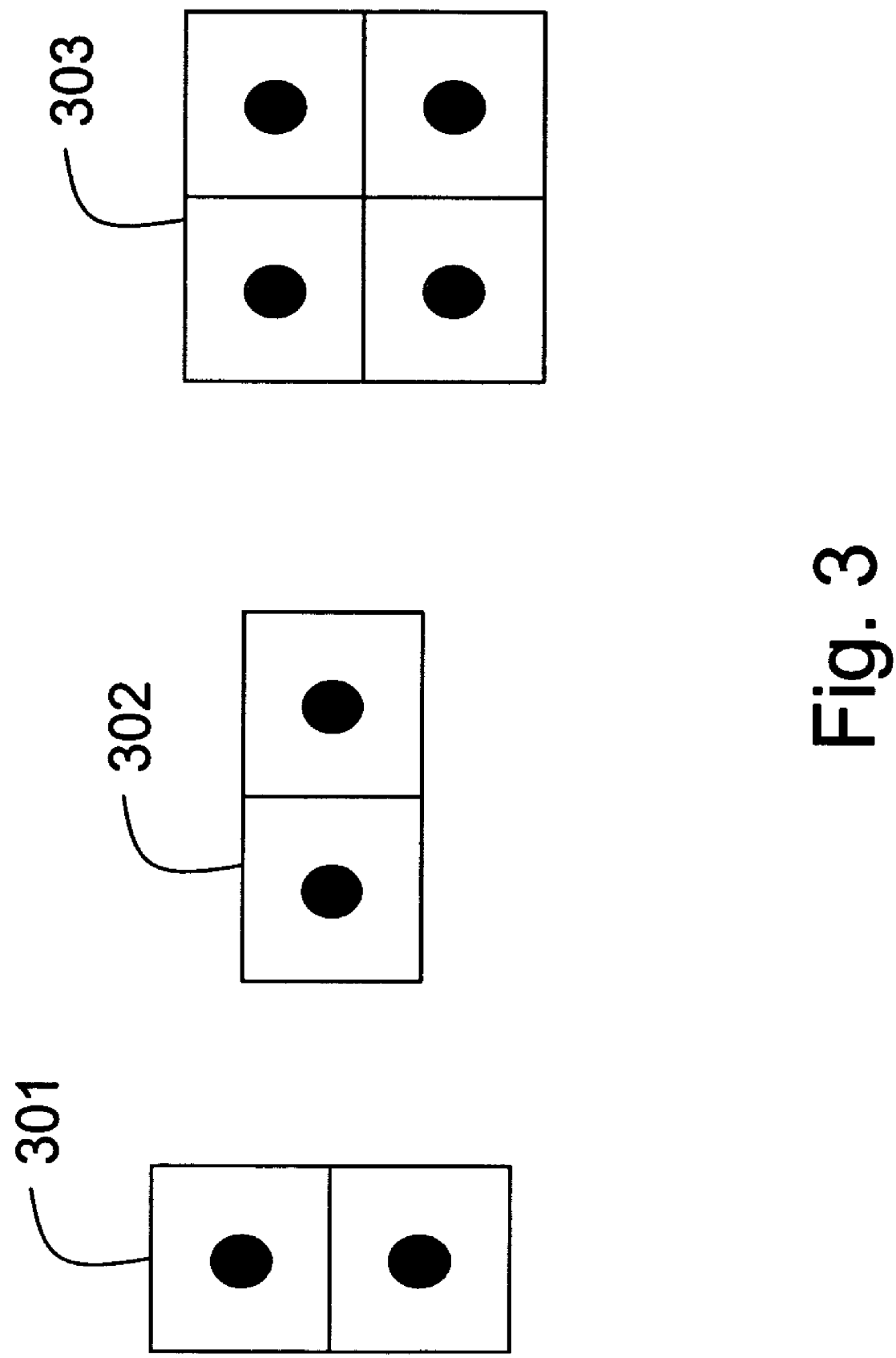
FIG. 3 is a block diagram of sensing element arrangements.

As shown in FIG. 2, each sensing elements 200 includes at least two energy intensity sensors 210. FIG. 3 shows alternative arrangements 301–303 of sensor elements. These arrangements can measure the gradient magnitude and sign in various directions, e.g., $G_x$ and $G_y$. In the preferred embodiment, the elements can be reconfigured dynamically into different 'cliques' as described below.

If the energy field is in the form of visible light, then the sensors 210 can be charge coupled devices (CCD), i.e., a metal-oxide-semiconductor (MOS) capacitor, which accumulates and stores a charge. For other forms of electromagnetic radiation, suitable sensors as known in the art can be selected.

Each output 211 of the intensity sensors 210 is connected to a multiplier 220, and the output of the multiplier is connected to an amplifier 230, which in turn is connected to an A/D converter 240, such that the inputs 231 to the A/D converter 240 are a logarithm (log) of the field intensity. The digital outputs 241 are connected so that an adder 250 that measures a difference between the log input signals 241 to produce a measure of the magnitude and signs of the local gradient 209 of the energy field. The multipliers 220 are individually connected to a gain controller 260, as described herein. The gain can also be dynamically adjusted for each element independently.

It is important to note that the above circuit measures and transfers the gradient magnitude differentially to reduce common-mode noise.

Logarithmic Gradient Measurement

Ideally, the array 110 is a 2-D grid of noiseless, infinitesimal-area elements that measure the gradient magnitudes 209 of the field 101. A spatial sampling rate of the elements should also exceed the highest frequency component in a point-spread function (PSF) of the lens to measure:

$$(g_x(m, n), g_y(m, n)) = \nabla I(m, n), \qquad (3)$$

where $\nabla I$ indicates the gradient magnitudes.

In practice, $g_x(m, n)$, $g_y(m, n)$ are difference signals from adjacent pairs of intensity sensors 210. In the preferred embodiment, we measure $\log(I_d)$ differences, to eliminate the exposure value k from the measurement:

$$lg_x(m, n) = \log(I_d(m+1, n)) - \log(I_d(m, n)),$$
$$= \gamma(\log(I_s(m+1, n)) - \log(I_s(m, n))),$$

and $$lg_y(m, n) = \gamma(\log(I_s(m, n+1) - \log(I_s(m, n))).$$

Each signed log gradient 209, $lg_x$ or $lg_y$, is determined from two locally adjusted intensity sensors 210. As long as both intensity sensors 210 use the same exposure k and contrast sensitivity y values, the exposure k value has no effect on the output image 102. This permits each gradient sensing element 200 to locally adjust its shared exposure k as needed to best avoid intensity saturation. In addition, the settings y for each $lg_x$ and $lg_y$ enable adjustment of the amplitude of the signal 231 to the A/D converter 240 for more accurate results.

The invention reproduces high contrast scenes from noisy, saturated, and quantized gradients with a consistently good accuracy. Even scenes with directly visible occluded light sources can be reproduced with gradient sensors having a maximum contrast ratios less than 100:1. It is possible to consider the camera as described herein as an array of interleaved four-pixel intensity cameras, each interleaved camera independently adjusting to the available light, and relaying its four sensed values in logarithmic form, as described below.

Measurement Cliques

Instead of measuring all gradients $lg_x$, $lg_y$ concurrently for the grid of N×M adapting sensing elements 200, we use multiple measurement steps because each measurement constrains a pair of intensity sensors 210 to share the same k and y values. If all values $lg_x$, $lg_y$ were measured at the same time, then the identical k and y values must apply for the entire image, as is done in conventional digital cameras that measure signal intensities. We want to avoid this limitation.

Figure 4:
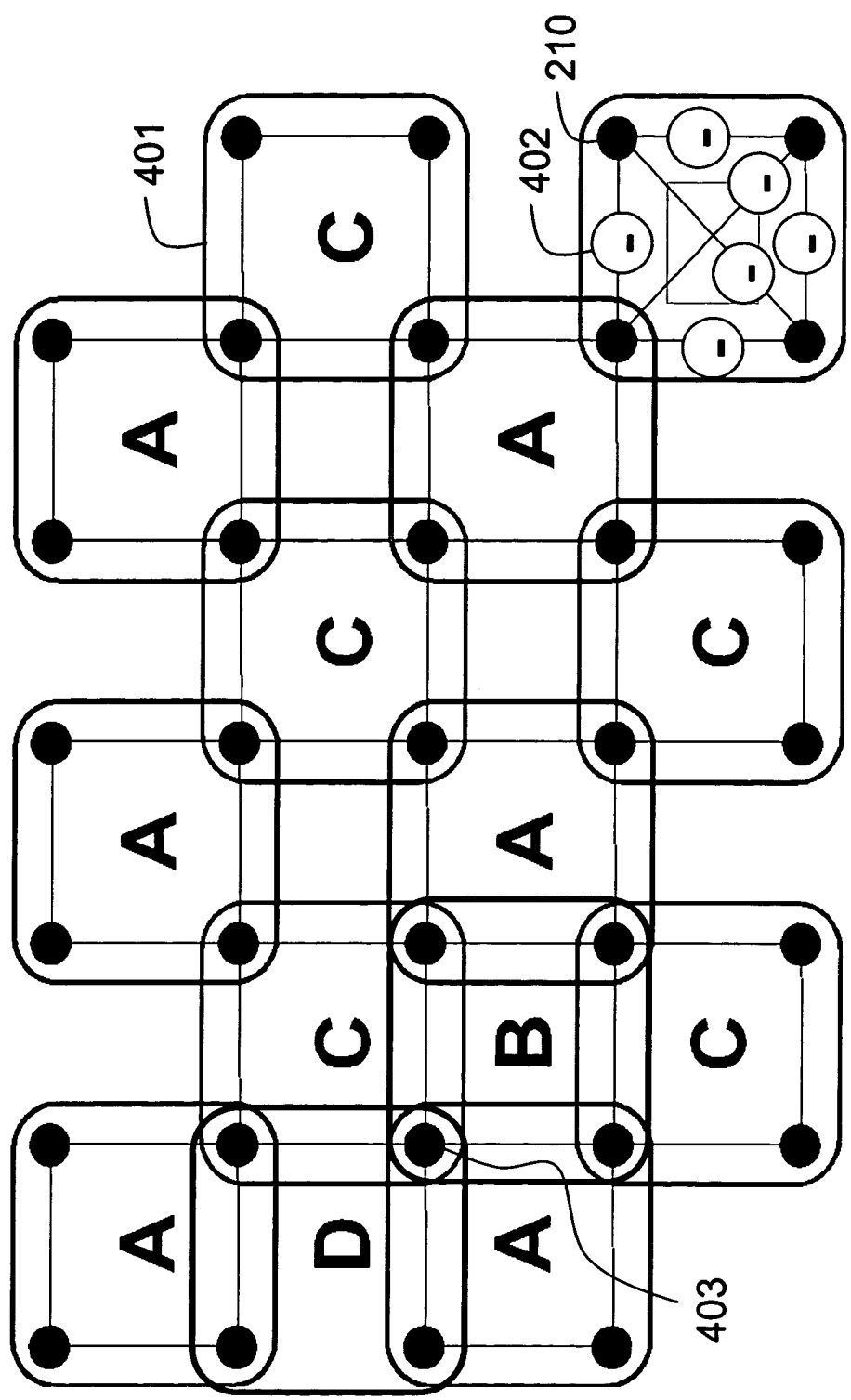
FIG. 4 is a block diagram of cliques of sensors.

Instead, as shown in FIG. 4, we dynamically partitioning the sensors into small disjoint groups of 'cliques' 401. The sensors can be reconfigured during operation so that any sensor can be a member of more than one clique.

In graph theory as known in the art, a clique is a completely connected set of nodes, i.e., each node has an edge or 'link' to another node. In a four-clique, each node connects to the other three nodes, and there are a total of six edges. In the gradient field according to the invention, the edges in the graphical representation are the sensed gradients.

In the system according to the invention, the differences 402 are measured between immediately adjacent pairs of sensors 210 to obtain four gradients for the clique. The gradients can also be measured on the diagonal to obtain six gradients, which further reduces the error.

Each clique measures the magnitude of the gradients 209 of the field independently. The k and y values for each clique 401 are adjusted independently to determine the $\log(I_s)$ values 231 for each clique, and the subsequent gradient.

The k and y values of a particular clique are selected dynamically to avoid intensity saturation. A number of different clique designs are possible. The simplest uses two sensor cliques, where each clique includes the pair of sensors used for one $lg_x$ or $lg_y$ measurement. In this design, each sensor 403 is a member of four different cliques, labeled A, B, C, and D, each with its own k and y value, as shown in FIG. 4.

Over time, each sensor belongs to more than one clique. The cliques measure the gradients sequentially. We define two or more sets of mutually disjoint cliques, i.e., cliques that do not share sensors, and measure each set in an interleaved manner. Measuring the sets of cliques sequentially enables us to adjust the shared k value of the current clique to the best value. Cliques of four adjacent sensors can be arranged in the checkerboard pattern as shown FIG. 4 using appropriate switching circuitry.

This 'box' clique checkerboard scheme measures all ($lg_x$, $lg_y$) values one time in just two sets of cliques A and C. Each clique selects between two local k values. Thus, the M×N array uses only MN/2 separate k values.

If we regard each clique member or sensor 210 as a node in a graph, and a difference between the members as a strength of 'links' between nodes, then the complete set of all differences between clique members formally define a connected graph that is a clique. Measuring these differences, after A/D conversion 240, ensures that $lg_x$, $lg_y$, and any diagonal links measured within a clique, has a zero 'curl', as described below.

Noise Rejection

Using cliques to measure the magnitude and sign of the local gradients improves common-mode noise rejection. It is important to note that each element 200 does not measure $lg_x$, $lg_y$ directly, but instead first measures $\log(I_s)$, for each sensor, and then subtracts 250 the logarithmic measurements digitally.

Many prior art image sensors transfer intensity signals as analog voltage, current or charge to an A/D converter that is not integrated into the sensor. This type of transfer is susceptible to noise, cross-talk from nearby digital circuits and external EMI/RFI.

Differential signaling, as used by the invention, improves immunity to noise by sending a signal and its negative (+S, −S) along two adjacent paths 203–204, see FIG. 2. Unwanted 'common-mode' noise N that couples to both paths is removed at by subtraction 250:

$$(N+S)-(N-S)=2S.$$

Sending the $\log(I_s)$ signals from four clique members along adjacent paths can provide common-mode noise rejection without additional signal pathways, because unwanted signals are cancelled by the subtraction used to determine the four $lg_x$, $lg_y$ values for the clique. In addition to common-mode noise rejection, clique inputs 231 to the A/D converter 240 enable 'auto-ranging' A/D conversion to further reduce quantization error in the $lg_x$, $lg_y$ measurements.

We also provide extra precision by dynamically modifying measurement ranges to fit to a wide range of incoming signal intensities. This permits fine quantization of the signals within every clique, even when differences are near zero and dominated by noise. This additional accuracy improves noise suppression by digital averaging of repeated measurements of the same local field gradients.

Image Generation Method

Figure 5:
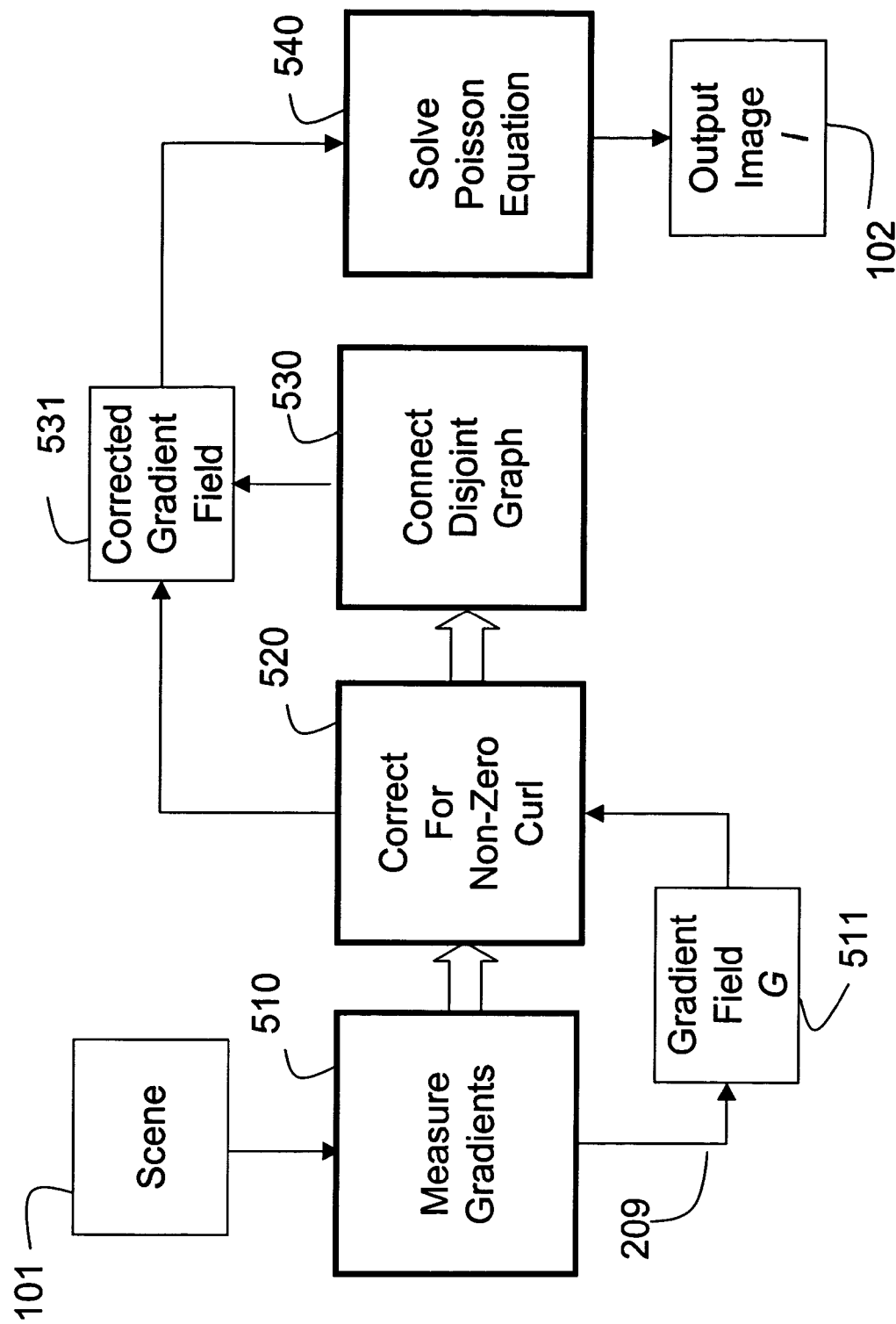
FIG. 5 is a flow diagram of a sensing method according to the invention.

FIG. 5 shows a method 500 according to the invention. The energy field 101, e.g., a 'scene', is measured 510 to acquire magnitudes and signs of the gradients 209. The gradients can be stored in the memory 221 as a gradient field 511. The gradient field 511, when represented as a graph, is corrected 520 for 'curl'. If the graph is disjoint, it is connected 530 to produce a corrected field 531. A Poisson equation is solved 540 using the corrected field 531 to generate the output image 102.

Specifically, we recover a 2D log intensity $I(=\log(I_d))$ having image gradients $I_x$ and $I_y$ that are substantially identical to the sensed gradients $lg_x$ and $lg_y$, in a least square sense.

Recovering the 2D log intensity can be accomplished by minimizing a function $$J(I)=\iint (I_x-lg_x)^2+(I_y-lg_y)^2 dxdy. \qquad (4)$$

The Euler-Lagrange equation to minimize J is $$\frac{\partial J}{\partial I} - \frac{d}{dx}\frac{\partial J}{\partial I_x} - \frac{d}{dy}\frac{\partial J}{\partial I_x} = 0, \qquad (5)$$

which gives the well-known Poisson equation $$\nabla^2 I = \frac{\partial}{\partial x}lg_x + \frac{\partial}{\partial y}lg_y, \qquad (6)$$

where $$\nabla^2 I = \frac{\partial^2 I}{\partial x^2} + \frac{\partial^2 I}{\partial y^2}$$

is the equally well known Laplacian operator. The display intensities $I_d$ can then be obtained from I.

A number of different techniques are known for solving 540 the Poison equation, such a multi-grid solver, successive-over-relaxation, and a direct analytical solution based on a sine transform, see W. H. Press, S. A. Teukolsky, W. T. Vetterling, and B. P. Flannery, "*Numerical Recipes in C: The Art of scientific Computing*, Cambridge University Press, 2nd edition, 1992, Simchony, R. Chellappa, and M. Shao, "*Direct analytical methods for solving Poisson equations in computer vision problems*," IEEE Trans. Pattern Anal. Machine Intell., 12(5), pp. 435–446, May 1990, and Jian Sun, Jiaya Jia, Chi-Keung Tang, and Heung-Yeung Shum, "*Poisson matting*," ACM Trans. Graph., 23(3), pp. 315–321, 2004.

Boundary Conditions

For image generation, we would like to use Dirichlet boundary conditions, as known in the art. However, this would require that we measure the absolute intensity values at the periphery of the array 110, which we are trying to avoid.

There, we provide a 1D ring of boundary elements 201 at the periphery or the array 110. The elements 201 only measure gradients at the periphery. All remaining interior elements measure the gradients with respect to the gradients acquired by the boundary elements. Therefore, the image intensities are first recovered from the boundary elements, and then from the remaining elements with respect to the intensities obtained from the set of boundary elements.

Image generation proceeds in two steps: first, we determine intensity values, up to an unknown offset, at the periphery of the image using the boundary sensing elements 201, which is a 1D problem: and second, we use the intensity values at the periphery to obtain for the intensity values for the interior pixels by solving the Poisson equation, which is a 2D problem.

The unknown offset in the reconstructed image, with one degree of freedom, amounts to a global exposure setting. The above solution yields a good reconstruction of the energy field 101, if sensing errors are corrected.

Sensor Error Corrections

Curl Correction

When derivative filters are applied to natural images, the outputs of the filters are sparse. Thus, the gradient values are low for most of the image. The adaptive measurements according to the invention ensure that only a small number of gradients are saturated. Because the gradients represent an underlying 2D function, the gradients form a conservative field.

A gradient field that is not conservative has a non-zero curl. Thus, gradients that are saturated have a non-zero curl. In addition, non-functional sensors, due to manufacturing defects, can also contribute to non-zero curl. Therefore, the invention corrects 520 for non-zero curl to produce the corrected conservative field 531.

Curl at a location (m, n) in the gradient field is defined as:

$$C(m, n) = (lg_x(m, n+1) - lg_x(m, n)) - (lg_y(m+1, n) - lg_y(m, n)), \quad (7)$$

which is the discrete equivalent of $lg_{xy} - lg_{yx}$. For a particular location (m, n), either $lg_x$ or $lg_y$ or both can be saturated. At most, this results in a non-zero curl at locations (m, n), (m, n−1) and (m−1, n). Thus, using the locations of saturated gradients, we can determine all the gradients that have a non-zero curl.

Let number of pixels that have non-zero curl be K. For each such pixel, equation 7 can be rewritten to give K curl equations. Let c be a K×1 vector obtained from stacking all the non-zero curl values in lexicographical order.

By lexicographical order, we mean the following. Let $C(m_1, n_1)$, $C(m_2, n_2)$, ..., $C(m_K, n_K)$ denotes the K non-zero curl values. Stack the values as a K*1 vector by sorting the 'm' and 'n' values in increasing order. The first entry in column will be the C value corresponding to minimum 'm' and 'n' value. Any entry 'below' an entry 'above' in the stack should have a greater 'n' value. If not, it should have a greater 'm' value. For example C(1,1), C(4,3), C(6,5), C(3,4), C(3,6), C(5,1), and C(5,5) are arranged as:

C(1,1)

C(3,4)

C(3,6)

C(4,3)

C(5,1)

C(5,5)

C(6,5)

Formally, let x denote all the $lg_x$ and $lg_y$ values appearing in all the K curl equations above, which can be written as $$x = \begin{bmatrix} x_1 \\ x_2 \end{bmatrix},$$

where $x_1$ is a P×1 vector denoting known, i.e., unsaturated, gradient measurements, and $x_2$ is a L×1 vector denoting saturated gradient measurements. Thus, we obtain the following linear system of equations $$Ax = A\begin{bmatrix} x_1 \\ x_2 \end{bmatrix} = c, \quad (8)$$

where A is a K×(P+L) sparse matrix. Each row of the matrix A represents one of the K equations, and has only four non-zero values: two +1's corresponding to $lg_x(m, n+1)$ and $lg_y(m, n)$, and two −1's corresponding to $lg_x(m, n)$) and $lg_y(m+1, n)$. By writing the matrix A as $$A^{K \times (P+L)} = [A_1^{K \times P} A_2^{K \times L}],$$

we obtain $$A_2 x_2 = c - A_1 x_1. \quad (9)$$

Thus, $x_2 = (A_2^T A_2)^{-1} A_2^T (c - A_1 x_1)$, and hence, the saturated gradient measurements can be recovered. The above solution is valid only when rank($A_2$)≧L. Situations when rank($A_2$)<L are described below.

Disjoint Graph Correction

As described above, we consider the gradients $lg_x$ and $lg_y$ as 'links' between nodes, and a saturated gradient represents a 'broken' link. A rank($A_2$) is equal to L when the sensing grid remains a connected graph or clique as defined by graph theory. However, if the saturated gradients or 'broken' links are such that they disconnect any nodes from the remainder of the grid, then curl cannot be corrected for those associated gradient.

In this case, the main grid is broken into disjoint graphs, e.g., if there is an extremely bright spot in the image, then all gradients on a boundary of the bright spot are saturated. Thus, all links connecting the bright spot to the rest of the image are broken, and nodes corresponding to the bright spot form a disjoint graph, which is disconnected from the main grid.

Our invention restricts errors in disjoint graphs. In the preferred embodiment, each such disjoint graph is connected 530 to the main grid by assigning a maximum gradient value to one of the disconnected links, and solves for remaining saturated gradients using curl correction.

HDR with Low-Contrast Details

Quantization

Even though the invention can acquire images with a very wide range of contrasts, gradient measurements have far less visible quantization errors when compared to a conventional intensity camera. Conventional intensity cameras approximate output images as functions with piecewise-constant values, where the A/D converter yields a fixed number of uniformly spaced quantization levels.

In contrast, the invention approximates the output image 102 as an intensity functions with piecewise-linear values, e.g., piecewise-constant gradients 209, with the number of required gradients set by the A/D converter.

Signal Dependent Noise

Even though curl and common-mode noise are reduced, noise concerns remain for any camera that is based on sensing gradients because it is well known that "gradients are always noisier." If each sensor has additive zero-mean Gaussian-distributed random noise with a variance V, then the noise in log difference measurements $lg_x$, $lg_y$ has a variance 2V, and the additional circuitry required for the gradient camera introduces new sources for noise.

However, gradient noise appears different in an output image. As we describe above, we solve the Poisson equation to integrate the sensors noisy gradients $g_x+N_x$, $g_y+N_y$ to reconstruct the image $I_{out}$, where the gradients most closely match $g_x$, $g_y$, in the least-squares sense. Integration is linear, that is, $I_{out}=I_{ideal}+I_N$, and gradient noise at a pixel (m, n) smoothly contributes a small error. The resulting noise-only image $I_N$ has a characteristically smooth, low-frequency, 'cloudy' appearance, as described below.

A property of the human visual system, known as edge masking, makes noise near step-like discontinuities less apparent. This suggests that it is less objectionable to have high noise in high gradients, and hence, our gradient camera reasonably 'hides' signal dependent noise.

Motion Rejection

Some conventional digital cameras use a stabilization mechanism to reduce blur caused by camera or scene motion. The gradient-sensing camera according to the invention tolerates piecewise linear change in intensities, which provides another strategy, and in addition reduces noise by selectively averaging gradients over a time interval. A conventional intensity camera can use the same strategy, but without reducing noise.

The basic idea is to use comparator circuits to compare current gradient measurements with time-averaged measurements. When the variation is greater than caused by noise, we terminate the averaging, and use the current value as a best estimate. Sharp image features that cause discontinuities in image intensities and gradients, such as step-like or ridge-like features, cause large changes in measured gradient as the features 'move' across the image plane. These features need to be rejected to keep the image sharp.

Unfortunately, this same strategy terminates much earlier in an intensity camera. Image regions with piecewise-constant gradient, e.g., smoothly shaded regions, can be accurately measured in the presence of motion in our gradient camera, but not in a conventional intensity camera. The extended measure-and-averaging time for the gradient camera according to the invention reduces the amount of noise in the measurements.

Other Noise Concerns

As described above, our gradient camera works well with signal dependent noise, where the noise is low for low gradients and high for high gradients. However, Gaussian distributed random noise has a 'cloudy' appearance due to the Poisson equation 531. One solution could reduce noise by selectively preserving high gradients with a bilateral filter as is done for conventional edge-preserving smoothing in images. However, directly applying bilateral filtering to gradients is less than satisfactory. Although a bilateral filter will not smooth when the gradient difference is large, the filter will smooth gradients close to high gradients, thus smearing edges.

We prefer to apply 515 Gaussian filters 516 that depend on the magnitude of the gradient, which restricts smoothing of high gradients. Thus, we smooth only low gradients. In addition, because the gradient field is a 2D field, we can use an elliptical spatial Gaussian filter. We call this extended directional bilateral filtering. The filtering kernel G can be expressed as $$G=G_s * G_{diff} * G_{mag}, \qquad (10)$$

where $G_s$ is an elliptical Gaussian filter with a low variance along the direction of the gradient, and a high variance perpendicular to the direction of the gradient. The filter $G_{diff}$ is a Gaussian filter that depends on the difference of gradient magnitude of a current location (pixel) and adjacent pixels. This prevents smoothing along sharp edges. The filter $G_{mag}$ is a Gaussian filter that depends on the magnitude of the gradient of the current pixel. The filter $G_{mag}$ ensures that high gradients are not smoothed. By selecting the widths and variances of the spatial filters, the results can be greatly improved.

Another approach handles the noise problem by obtaining a meaningful representation of the intensities, and uses the intensities to constrain the Poisson reconstruction. Because high gradients are more important for preserving sharpness and edges, one can first reconstruct a partial image only from high gradients, and use that reconstruction as a constraint, in the least square solution, to reconstruct intensity values from low gradients.

Calibration from De-Focus

For proper operation, the gain settings for the intensity sensors in a 'clique' must match, and be changed dynamically as the incident signal intensities change. The setting can be matched during manufacturing, or during operation.

The relatively small size of the sensing elements 200 ensures that an intentional de-focusing provides virtually identical signal intensities to each sensor in each clique. Thus, de-focusing can be used as a reliable reference for removing any non-zero offset between clique members. Similarly, opening and closing the aperture can widely vary the uniform intensity incident on each clique, and can be used as a reliable reference for matching the sensitivity settings or gain for each sensing element. If a higher dynamic range is necessary for more accurate gain matching within cliques, then a de-focused view of the sky, the sun, or a bright light bulb can provide the necessary lighting extremes.

In-Camera Effects

Several gradient-based image manipulation techniques can be provided as in-camera effects. These include user-defined depth-of-focus, by combining multiple focusing distances in the same image, or deep focus with large lens apertures. Moving foreground objects can be removed automatically from a static scene, e.g., moving cars and pedestrians, by extending the averaging time, and rejecting outliers in the gradients. Atmospheric haze can also be removed. Lens flare can be suppressed, and lens glare can be removed partially by suitable gradient manipulation.

It should be noted that such operations can be done on images acquired by conventional cameras. However, there the gradient field needs to be extracted, in a post-processing step, from the pixel intensity values of the already processed output image, with all its cumulative inherent errors. Then, the gradients are further processed, and a new output image is reconstructed from the processed gradients obtained from the output image.

In contrast, the invention produces the in-camera effects by operating directly on the raw input data, i.e., the signed gradients, before the output image is produced.

Log Domain Gradients Measurements

Gradient signals are well suited for A/D conversion, because even for high contrast scenes, most of the gradient magnitudes are low. The few truly large gradients are usually caused by occluded edges of directly visible light sources. By measuring in the log domain, even these gradients are limited to no more than the maximum $Lg_x$, $lg_y$ measurable from the impulse response, i.e., point-spread function, of the camera lens. There are no similar limits when the intensities are measured directly by a conventional camera.

Quantization Tolerance

Quantization methods seem to offer many opportunities for performance improvements for gradient cameras.

Because histograms of the log gradients peak around zero, quantizers that allot additional levels to small gradients than to larger gradients have a lower overall RMS measurement error.

Similarly, the human visual system is roughly ratiometric. For most of the usable intensity range of human vision, 'just noticeable differences' in brightness describe a contrasts of about one to two percent. By digitizing gradients in the log domain, gradient quantization levels correspond directly to contrasts, and are independent of sensor gain or intensity offset.

Several other forms of adaptive quantization can further improve the use of A/D quantization levels to enhance scene contrasts. For example, auto-ranging A/Ds can allocate quantizing levels to fit signals for each clique. Gradient histogram equalization can also be used. Alternatively, the user can select the quantization levels to best image the scene.

Clique Choices

Straightforward extensions of four-clique sets A,B,C,D as shown in FIG. 4 can further reduce noise as they complete two independent measurements for each $lg_x$, $lg_y$ value, and are capable of measuring a complete set of diagonal differences.

For example, the results from all four cliques (A,B,C,D) can be combined. Then, we can use a Poisson solver whose filter kernel is eight-connected instead of four-connected, making convergence faster and further reducing the noise in the reconstructed output image. The interleaved (A,C) arrangement can also by improved by using position-dependent filtering kernels.

The eight-connected difference measurements for every (m, n) location, e.g., $\log(I(m\pm1, n\pm1))-\log(I(m, n))$, double the number of curl-free measurements, and can be used with a nine-point filter kernel reconstruction to further reduce noise. The best arrangements of cliques and clique sets balance geometry and sensor chip abilities. Larger cliques can mean less k-adjusting circuitry, but increases the chance that a clique member sensor saturates with the widely-shared k value, reducing sensor effectiveness.

Clique shape and geometric tiling rules determine how many different clique sets are required to measure all ($lg_x$, $lg_y$) values. The number of choices increase rapidly with clique size. Clique designs that require many clique sets can increase the time required to acquire an image.

Although the invention is described in terms of measuring a static scene, it should be understood that a spatio-temporal gradient camera according to the invention can acquire a video with motion. Similarly, the above description focuses on analyzing luminance. Our HDR techniques can treat chrominance during post-processing. Chrominance is generally low-contrast. Therefore, color can be sensed by single sets of sensors. Patterns, other than a rectangular grid, can also be considered. For example, a diagonal grid superimposed on an axis-aligned grid can improve convergence.

Effect of the Invention

The invention provides a gradient camera that measures an energy field by reconstruction of its locally-sensed gradients. This camera has a number of significant advantages over conventional cameras. No exposure metering is required to acquire a high contrast scenes. The effects of quantization are reduced, and noise is distributed as a low frequency error. The visual properties of gradient-based image reconstructions are perceptually pleasing.

The invention can uses fewer quantization levels. As few as four bits for quantized gradients produce a similar appearance as eight bits of pixel intensities because quantized intensities approximate images as being piecewise-constant, while quantized gradients approximate images as piecewise-linear.

The camera according to the invention is tolerant to noise. The signal-dependent gradient noise is proportional to the magnitude of the gradient, which is far less noticeable than noise proportional to image intensity as in conventional cameras.

The invention can automatically correct for saturated gradient sensors, as well as malfunctioning individual sensors, without an explicit predetermined map of those detectors. Furthermore, intrinsic differential signaling improves common-mode noise rejection. Motion-smear can also be suppressed for hand-held cameras.

In addition, gradient-based image manipulation techniques can provide in-camera effects. Individual gradient sensors can select gain and exposure-time to minimize both blur and noise. Unlike noise in digital intensity cameras, which resembles film grain, sensed gradient noise, after image reconstruction, appears as a low-frequency distributed error with a 'cloudy' appearance that does not obscure edges and is masked by the higher contrast, higher-frequency contents of the image itself.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A sensing apparatus, comprising:
   a set of sensing elements, wherein each sensing element is arranged in an energy field to measure directly a magnitude and sign of a local gradient of the energy field.

2. The apparatus of claim 1, in which the energy field is electromagnetic radiation.

3. The apparatus of claim 2, in which the electromagnetic radiation is visible light.

4. The apparatus of claim 1, in which the set of sensing elements is arranged at an image plane as an N×M array of elements.

5. The apparatus of claim 1, in which the set of sensing elements is arranged as a cylinder.

6. The apparatus of claim 1, in which the set of sensing elements includes a set of boundary elements at a periphery of the set of sensing elements.

7. The apparatus of claim 1, further comprising:
   a memory configured to store the magnitudes and signs of the gradients as a gradient field.

8. The apparatus of claim 1 further comprising:
   a lens; and
   a shutter.

9. The apparatus of claim 1, in which each sensing element further comprises:
   a plurality of energy intensity sensors, each energy intensity sensor configured to measure a local intensity of the energy field to obtain a plurality of intensities; and
   means for subtracting the plurality of intensities from each other to obtain the magnitude and sign of the local gradient.

10. The apparatus of claim 9, in which the plurality of energy intensity sensors and the means for subtracting of each sensing element are connected and transferred differentially.

11. The apparatus of claim 9, each energy intensity sensor is a charge coupled device.

12. The apparatus of claim 1, further comprising:
means for dynamically controlling a gain of each sensing element independently of other sensing element to avoid sensor saturation.

13. The apparatus of claim 1, in which a logarithm of the magnitude is measured by each sensing element.

14. The apparatus of claim 9, in which the plurality of energy intensity sensors of the set of sensing elements are dynamically partitioning into disjoint sets of cliques.

15. The apparatus of claim 14, in which each clique includes four energy intensity sensors, and each clique is configured to measure four magnitudes of the local gradient.

16. The apparatus of claim 14, in which each clique includes four energy intensity sensors, and each clique is configured to measure six magnitudes and sign of the local gradient.

17. The apparatus of claim 14, in which the disjoint sets of cliques measure the gradients in an interleaved manner.

18. The apparatus of claim 1, further comprising:
means for generating an output image representing the energy field from the gradient magnitude and signs.

19. The apparatus of claim 18, further comprising:
means for generating a gradient field from differences of logarithms of intensities of the energy field;
means for solving a Poisson equation using the gradient field to recover intensity values of pixels in the output image.

20. The apparatus of claim 19, further comprising:
means for correcting curl in the gradient field.

21. The apparatus of claim 20, in which the Poisson equation is $$\nabla^2 I = \frac{\partial}{\partial x} lg_x + \frac{\partial}{\partial y} lg_y,$$

where $$\nabla^2 I = \frac{\partial^2 I}{\partial x^2} + \frac{\partial^2 I}{\partial y^2}$$

is a Laplacian operator for a pixel intensity at a local (x, y) in the output image I, and lg indicates differences of logarithms of sensed intensities of the energy field.

22. The apparatus of claim 21, in which the set of sensing elements include a set of boundary elements at a periphery of the set of sensing elements, and further comprising:
means for determining the intensity values from the set of boundary elements; and
means for determining the intensity values from the remaining sensing elements with respect to the intensities of the set of boundary elements.

23. The apparatus of claim 21, in which curl at a location (m, n) in the gradient field is defined as:

$C(m, n)=(lg_x(m, n+1)-lg_x(m, n))-(lg_y(m+1, n)-lg_y(m, n))$.

24. The apparatus of claim 1, further comprising:
means for averaging the gradients over time to reduce noise effects due to motion.

25. The apparatus of claim 19, further comprising:
means for filtering the gradient field.

26. The apparatus of claim 25, in which the filtering applies a directional bilateral filter to the gradient field.

27. The apparatus of claim 26, in which the directional bilateral filter is expressed as a filter kernel G, such that $G=G_s*G_{diff}*G_{mag}$, where a filter $G_s$ is an elliptical Gaussian filter with a low variance along a direction of the gradient and a high variance perpendicular to the direction of the gradient, a filter $G_{diff}$ is a Gaussian filter dependant on a difference of the gradient magnitude at a current location and adjacent locations, and a filter $G_{mag}$ is a Gaussian filter that depends on the magnitude of the gradient at the current location.

28. The apparatus of claim 18, in which a partial image is first generated from relatively high gradient magnitudes, and constraining the generation of the entire output image according to the partial image.

29. The apparatus of claim 1, further comprising:
means for de-focusing the energy field to calibrate the set of sensing elements.

30. The apparatus of claim 18, in which moving foreground objects are removed from the output image by outlier operations of the gradient field.

31. The apparatus of claim 18, in which atmospheric haze is removed from the output image by operating on the gradient field.

32. The apparatus of claim 18, in which lens flare and lens glare are decreased in the output image by operating of the gradient field.

33. The apparatus of claim 1, in which the magnitudes are quantized.

34. The apparatus of claim 33, in which a number of quantization levels is determined automatically.

35. The apparatus of claim 33, in which a user determines a number of quantization levels.

36. The apparatus of claim 1, in which the magnitudes and sign of the gradients are measured in a static scene.

37. The apparatus of claim 1, in which the magnitudes and sign of the gradients are measured spatio-temporally to produce a video.

38. The apparatus of claim 1, further comprising:
means for measuring frequencies of the energy field.

39. The apparatus of claim 1, in which the set of sensing elements are arranged as a rectangular grid of sensing elements superimposed on a diagonal grid of sensing elements.

40. A method for sensing an energy field, comprising:
arranging a set of sensing elements in an energy field; and
sensing directly a magnitude and sign of a local gradient of the energy field with each sensing element.

41. The method of claim 40, in which a radiation of the energy field is visible light.

42. The method of claim 40, further comprising:
arranging the set of sensing elements at an image plane as an N×M array of elements.

43. The method of claim 40, further comprising:
arranging the set of sensing elements as an annular ring.

44. The method of claim 40, further comprising:
storing the magnitudes of the gradients in a memory as a gradient field.

45. The method of 40, in which each sensing element includes a plurality of energy intensity sensors, each energy sensor configured to measure a local intensity of the energy field to obtain a plurality of intensities; and
subtracting the plurality of intensities from each other to obtain the magnitude of the gradient.

46. The method of claim 45, in which the plurality of energy intensity sensors and the means for subtracting are connected differentially.

47. The method of claim 45, further comprising:
means for dynamically controlling a gain of each sensing element independently of any other sensing element to avoid saturation.

48. The method of claim 40, in which a logarithm of the magnitude is measured by each sensing element.

49. The method of claim 45, further comprising:
dynamically partitioning the set of intensity sensors of the set of sensing elements into disjoint sets of cliques.

50. The method of claim 49, further comprising:
measuring four magnitudes of the local gradient with each clique.

51. The method of claim 49, in which the disjoint sets of cliques measure the gradients in an interleaved manner.

52. The method of claim 40, further comprising:
generating an output image representing the energy field from the magnitudes and signs of the gradients.

53. The method of claim 52, further comprising:
generating a gradient field from a logarithm of the magnitudes; and
solving a Poisson equation using the gradient field to recover intensity values of pixels in the output image.

54. The method of claim 53, further comprising:
correcting curl in the gradient field.

55. The method of claim 53, in which the Poisson equation is $$\nabla^2 I = \frac{\partial}{\partial x} lg_x + \frac{\partial}{\partial y} lg_y,$$

where $$\nabla^2 I = \frac{\partial^2 I}{\partial x^2} + \frac{\partial^2 I}{\partial y^2}$$

is a Laplacian operator for the intensity at a location (x, y) in the output image I, and lg indicates the logarithms.

56. The method of claim 53, in which the set of sensing elements include a set of boundary elements at a periphery of the set of sensing elements, and further comprising:
determining the intensity values from the set of boundary elements; and
determining the intensity values from the remaining sensing elements with respect to the intensities of the set of boundary elements.

57. The method of claim 40, further comprising:
averaging the gradients over time to reduce noise effects due to motion.

58. The method of claim 53, further comprising:
filtering the gradient field.

59. The method of claim 58, in which the filtering applies a directional bilateral filter to the gradient field.

60. The method of claim 59, in which the directional bilateral filter is expressed as a filter kernel G, such that $$G = G_s * G_{diff} * G_{mag},$$

where a filter $G_s$ is an elliptical Gaussian filter with a low variance along a direction of the gradient and a high variance perpendicular to the direction of the gradient, a filter $G_{diff}$ is a Gaussian filter dependant on a difference of the gradient magnitude at a current location and adjacent locations, and a filter $G_{mag}$ is a Gaussian filter that depends on the magnitude of the gradient at the current location.

61. The method of claim 40, further comprising:
de-focusing the energy field to calibrate the set of sensing elements.

62. The method of claim 40, further comprising:
measuring frequencies of the energy field.

63. A camera, comprising:
a set of sensing elements, each sensing element arranged in a light field to measure directly a magnitude and sign of a local gradient of the light field, in which the set of sensing elements is arranged at an image plane as an N×M array of elements, and in which each sensing element further comprises:
a plurality of energy intensity sensors, each energy sensor configured to measure a local intensity of the energy field to obtain a plurality of intensities; and
means for subtracting logarithms of the plurality of intensities from each other to obtain the magnitude and sign of the gradient.

64. The camera of claim 63, further comprising:
a lens;
a shutter; and
a memory configured to store the magnitudes of the gradients.

65. The camera of claim 63, in which the plurality of energy intensity sensors and the means for subtracting of each sensing element are connected differentially.

* * * * *